F. ROACH.

Assignor to self and J. Zane.

FAUCET.

No. 7,571. Reissued March 27, 1877.

WITNESSES

Frankly Parker

F. F. Raymond 2d

INVENTOR

Francis Roach

N. PETERS, PHOTO-LITHOGRAPHER, WASHINGTON, D. C.

UNITED STATES PATENT OFFICE.

FRANCIS ROACH, OF BOSTON, MASSACHUSETTS, ASSIGNOR TO HIMSELF AND JOSEPH ZANE, OF SAME PLACE.

IMPROVEMENT IN FAUCETS.

Specification forming part of Letters Patent No. 81,948, dated September 8, 1868; reissue No. 7,571, dated March 27, 1877; application filed February 22, 1877.

*To all whom it may concern:*

Be it known that I, FRANCIS ROACH, of Boston, in the county of Suffolk and State of Massachusetts, have invented a new and useful Improvement in Faucets or Cocks for Water-Closets; and I do hereby declare the same to be fully described in the following specification and represented in the accompanying drawings, of which—

Figure 1:
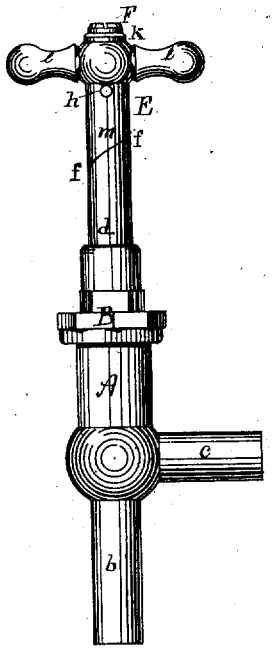
Figure 2:
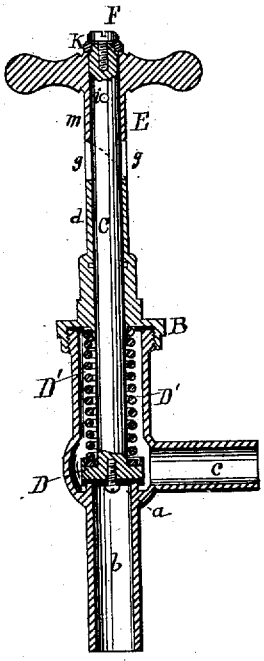

Figure 1 is an elevation, and Fig. 2 a longitudinal section, of a faucet or cock provided with my improvement.

In this faucet the valve is closed by the expansive power of a spring, and is raised off its seat by a rotary tubular key, arranged in line with, and constituting part of, the faucet-neck, which goes through the seat-board of the closet.

In the drawings, A denotes the valve-case of the cock or faucet, such case being provided with a valve-seat, *a*, an induction-tube, *b*, and an eduction-tube, *c*, they being arranged as represented in Fig. 2.

A cap, B, having a tubular neck, *d*, extending upward from it, as shown in the drawings, is screwed on the top of the valve-case A. A cylindrical spindle or rod, C, having at its lower end a valve, D, to rest on the seat *a*, extends upward through the case A, the cap B, and the neck *d*, and projects out of and above the latter, in manner as exhibited in Fig. 2.

A helical spring, D′, encompasses the part of the spindle C which is within the case A, and at its upper end bears against the lower part of the cap. The lower end of the spring rests on the valve, the said spring, by its expansive force, operating to keep the valve on its seat against the pressure of the fluid when in the induction-tube *b*.

A tubular key, E, provided with two or any other proper number of arms, *e e*, encompasses that part of the spindle C which projects above the neck *d*; and its barrel *m* has a diameter equal to that of the neck, the said barrel being in prolongation of, or in line with, the neck, in manner as represented.

At its top the said key rests against an annulus, *k*, held in place on the spindle C by the head of a screw, F, screwed into the upper end of such spindle C.

Figure 4:
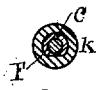

A horizontal section of the annulus and the upper part of the spindle is represented in Fig. 4, where, it will be seen, the two are so formed that the annulus cannot revolve on the spindle. The annulus, so combined with or applied to the spindle, prevents the key, while being revolved, from unscrewing the screw F.

Figure 3:
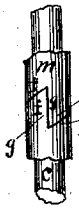

The lower end of the key and the upper end of the neck *d* are each formed with two semi-helical cams, *f f*, and two stops or shoulders, *g g*, they being formed and arranged as shown in Figs. 1, 2, and 3, the latter of which is a representation of the cams and stops, as shown in a plane at right angles to that in which the elevation of Fig. 1 is taken.

By revolving the key E on the spindle C, the cams of the said key will be made to turn and rise on those of the neck, so as to raise the valve off its seat against the expansive force of the spring, which will cause the key to revolve in the opposite direction, and will close the valve on the withdrawal of the hand of the operative from the arms of the key.

A small hole, *h*, made in the upper part of the key, and arranged in manner as shown in Fig. 1, serves to allow oil to be poured into the key to lubricate it.

It also serves, in connection with another hole, *i*, made in the spindle, to receive a pin, to hold the spindle and the key in their proper positions to receive the annulus and the screw, after contraction of the spring.

I make no claim to the employment and arrangement of a spring, in manner as represented, to return a valve toward and hold it firmly to its seat against the pressure of a fluid tending to force the valve off its seat. Nor do I claim, for the purpose of raising or moving the valve off its seat when pressed thereon by a spring, the combination of a cammed lever with the stem of the valve, and so as to turn in a vertical plane against the top of the valve-case.

Nor do I claim any construction or arrangements of parts as exhibited in the United States Patent No. 71,790, granted to me or my assignees, as my present faucet differs materially from that described in such patent, and is capable of accomplishing what cannot be effected with such patented faucet.

The advantage of my improvement is, that by means of it the valve is not revolved so as to grind on or against its seat, and it is left free to accommodate or adjust itself to its seat under the pressure of the spring, for the key E attains its lowest position on the spindle C after the valve has met its seat.

To allow the spring full action to press the valve upon its seat is the main purpose of the adjusting-screw F and the annulus *k*, applied to the spindle in the manner set forth.

In lieu of the cam and stops, as described, the key may be screwed upon a screw formed on the neck *d*, and so made as to enable the valve to be held off its seat when raised therefrom, the screw F and the annulus *k*, applied to the spindle as described, being used with such a change.

It will be seen that this invention consists in combining and arranging the following parts with each other, viz:

A water-way for induction, having a valve-seat near its inner end or upon it.

A valve closing upon the valve-seat against the pressure of the water.

A spring of greater power than the water-pressure, pressing the said valve toward or upon the valve-seat.

A delivery water-way, connected into one channel with the induction water-way, and at one side of the valve-seat.

A rotating key, having a formation which, in combination with the formation of the cap of the faucet, against which the key abuts, compels said key to rise upon the neck of the faucet as the key is rotated.

A swivel-connection between the key and valve, which obliges the key to do all the work of lifting the valve, and the spring to do all the work of returning the valve to its seat in a substantially right line.

It will also be seen that in the drawing said invention is illustrated mainly with reference to a hopper-cock; but it will be seen that the contrivances making the combination are of much greater consequence than the form of the body of the cock, and being mainly, as drawn, except the valve-seat, attached to the cap or bonnet of the faucet, it is obvious that they are applicable to all sorts of cocks as well as hopper-cocks.

It will also be observed that the valve is preferably arranged to ascend and descend to the valve-seat without rotation, and that the swivel is introduced between the valve and key, made, in this instance, by a cap, washer, and screw.

It will also be seen that the spring fits loosely around the stem, and is centered upon it by the nipple projecting downward from the base of the cap, and that in fitting the spring its upper and lower ends are cut so as to form bearings against the base of the cap and the valve at right angles to the axial line of the spring, and that the key has two arms, as shown, and is made with a cylindrical cavity, through which passes the valve-stem. The cavity of the key is a trifle larger than the valve-stem, and one or more cams or inclines are formed upon its end, conversely corresponding to the cam or cams formed on the top of the neck.

It will be seen that the inclines are generally cut at an angle steeper than the angle of repose, and that the residual pressure of the spring, when the valve is off its seat and the water is running through, and part of the force of the spring is necessarily balanced by the water-pressure, must be sufficiently great to bring down the valve, the key turning along the inclines.

A faucet thus constructed, with inclines steeper than the angle of repose under the pressure of the spring, will be a self-closing faucet—that is to say, it will shut when opened on letting go the key or handle.

It will be seen that the valve-seat is represented as a raised seat, and the valve is a cup-valve with soft or compressible packing.

It will be observed, further, that in case the head of water should increase from any cause, or from freezing or steam-pressure, the pipes do not have the tendency to burst as when plug-faucets, or faucets in which the valve is forced to its seat by a screw-follower or by any positive motion, are used, or like valves shutting with the pressure of the water, but the spring yields and the valve becomes a safety-valve; and, also, that the valve and seat are not worn or crushed by compressing, as the force driving and holding the valve to the seat is a pressure which cannot exceed that which existed when the faucet was new, and when the water is partly balanced the valve shuts with a constantly-decreasing velocity, partly because the pressure of the water increases as the orifice in the seat closes, and partly because the force of the spring expends as it reaches the limit of throw. This arrangement obviates partially or entirely the "water-hammer."

Having thus fully described my invention, I claim and desire to secure by Letters Patent of the United States—

1. The combination of the induction and eduction pipes *b c*, the valve-seat *a*, the valve D, the case A, the spring D′, the stem C, the cap B, the neck *d*, the key E, and the cams *f f* and stops *g g*, the whole being as and to operate as hereinbefore described, and as represented in the accompanying drawings.

2. The key E and the spindle C, having the two holes *h i*, arranged and combined with the valve, its spring, and case, as specified.

3. The combination of the adjusting-screw F and the annulus *k*, applied to the spindle C, as described, with the key E, arranged with the spindle C, its valve and spring, and the neck *d*, substantially in manner and under circumstances as hereinbefore specified.

4. The valve D, forced toward and held to its seat against the pressure of the water by the spring D′, in combination with the cams or inclines *f f* and the rotating key E, operating with said cams or inclines to raise the valve D, substantially as herein described.

5. The stops *g g* on the neck of the faucet, in combination with the key E, substantially as and for the purpose described.

6. The nipple projecting downward from the cap of the faucet, as a means of centering the spring D′ upon the valve-stem, substantially as described.

FRANCIS ROACH.

Witnesses:
F. F. RAYMOND, 2d,
E. W. FOGG.